US005339435A

United States Patent [19]
Lubkin et al.

[11] Patent Number: 5,339,435
[45] Date of Patent: Aug. 16, 1994

[54] HETEROGENOUS SOFTWARE CONFIGURATION MANAGEMENT APPARATUS

[75] Inventors: David C. Lubkin, Nashua; Douglas B. Robinson, Hollis, both of N.H.; Robert P. Chase, Jr., Newton, Mass.; Paul J. Leach, Winchester, Mass.; Daniel L. McCue, III, Framingham, Mass.; David B. Leblang, Wayland, Mass.

[73] Assignee: Hewlett-Packard Company, Palo Alto, Calif.

[21] Appl. No.: 158,180

[22] Filed: Nov. 24, 1993

Related U.S. Application Data

[63] Continuation of Ser. No. 662,561, Feb. 28, 1991, abandoned.

[51] Int. Cl.⁵ .............................................. G06F 15/20
[52] U.S. Cl. ..................................... 395/700; 395/200; 395/500; 364/280.4; 364/280.6; 364/284.4; 364/DIG. 1
[58] Field of Search ............... 395/200, 500, 650, 700; 364/280.4, 280.6, 284.4

[56] References Cited

U.S. PATENT DOCUMENTS

| | | | |
|---|---|---|---|
| 4,315,315 | 2/1982 | Kossiakoff | 395/700 |
| 4,558,413 | 12/1985 | Schmidt et al. | 395/700 |
| 4,667,290 | 5/1987 | Goss et al. | 364/200 |
| 4,734,854 | 3/1988 | Afshar | 395/700 |
| 4,809,170 | 2/1989 | Leblang et al. | 364/200 |
| 4,858,114 | 8/1989 | Heath et al. | 364/200 |
| 4,951,192 | 8/1990 | Chase, Jr. et al. | 364/200 |
| 5,075,847 | 12/1991 | Fromme | 395/700 |
| 5,084,813 | 1/1992 | Ono | 395/1 |

OTHER PUBLICATIONS

John Banning, "The XDOS Binary Code Conversion System", IEEE, 1989, pp. 282–287.

Adams et al., "SunPro: Engineering a Practical Program Development Environment", Proc. of International Workshop on Advanced Prog. Environments, Jun. 1986, pp. 2–12.

Leblang et al., "Computer-Aided Software Engineering in a Distributed Workstation Environment," Proc. of ACM SIGSOFT/SIGPLAN, Apr. 1984, pp. 104–112.

Comer, Douglas et al., "Shadow Editing: A Distributed Service for Supercomputer Access," Presented at the 8th International Conference on Distributed Computing Systems, San Jose, Calif. (1988, Jun.).

Bicknell, Paul A., "Software Development and Configuration Management in the Cronus Distributed Operating System," Proceedings of Conference on Software Maintenance–1988, Institute of Electrical and Electronics Engineers, Phoenix, Ariz. (1988, Oct.).

Lubkin, David, "Heterogeneous Configuration Man- (List continued on next page.)

*Primary Examiner*—Gareth D. Shaw
*Assistant Examiner*—Dennis M. Butler

[57] ABSTRACT

A heterogeneous configuration management tool enables building of a software system in a heterogeneous network of computers. In building a desired software system, the tool enables at least one component of the system to be translated by a foreign computer of the network and other components of the system to be translated by other computers of the network. A reference to a version indicator is passed to the foreign computer to provide the foreign computer an indication of user-specified version of the component being translated by the foreign computer. The reference is expanded during processing on the foreign computer. Pathname transformation files are employed to provide transformation of a pathname in one computer of the network to a corresponding pathname in another computer of a network. Binaries resulting from component translations are stored in split pools. In turn, split releases of the built software system are enabled.

23 Claims, 7 Drawing Sheets

OTHER PUBLICATIONS agement with DSEE," *Proceedings of the 3rd International Workshop on Software Configuration Management*, Trondheim, Norway, (1991, Jun.).

Hendricks, D., "The Translucent File Service," *Proceedings of the European Unix Systems Users Group Autumn 1988 Conference*, Cascais, Oct. 3-7, 1988, pp. 87-93.

Honda, M. et al., "Software Management Using a CASE Environment," *Proceedings of the USENIX Workshop on Software Management*, New Orleans, Apr. 3-4, 1989, pp. 11-16.

Hume, A. G., "The Use of a Time Machine to Control Software," *Proceedings of the USENIX Workshop on Software Management*, New Orleans, Apr. 3-4, 1989, pp. 119-124.

Miller, T. C., "A Scheme for Configuration Management," *Proceedings of 2nd International Workshop on Software Configuration Management*, Oct. 24-27, 1989, pp. 26-29.

Adams, E. W. et al, "Object Management in a CASE Environment," *Proceedings of 11th International Conference on Software Engineering*, May 1989, pp. 154-163.

| |
|---|
| version 67 |
| record of pathnames 69    pathname of vswitch object<br>pathname of command node<br>pathname of command system directory |
| current working directory 77 |
| record 70    UID of version map<br>Version map computer |
| foreign builder 73 |
| apollo reference path 71 |
| host type 72 |
| permanence flag 68 |
| host reference path 75 |
| shell pathname and arguments 79 |
| record 74    length of 76<br>length of 78 |
| environment variables 76 |
| translate script 78 | vswitch object 25

*Fig. 7*

HETEROGENOUS SOFTWARE CONFIGURATION MANAGEMENT APPARATUS

This is a continuation of copending application Ser. No. 07/662,561 filed on Feb. 28, 1991, now abandoned.

BACKGROUND OF THE INVENTION

Generally speaking, Computer-Aided Software Engineering (CASE) environments include software management tools which automate the control and management of software configurations. Some software management tools enable complex software systems (application programs) or portions thereof to be constructed from individually designed components. Most software management tools also enable continued and increasing development of computer software such that updated versions (releases) of computer programs are periodically made available.

One such CASE tool is described in U.S. Pat. No. 4,809,170 "Computer Device for Aiding in the Development of Software Systems" and U.S. Pat. No. 4,951,192 "Device for Managing Software Configurations in Parallel in a Network". That CASE tool is made for the Domain/OS operating system of Apollo Computer and is commonly known as DSEE (Domain Software Engineering Environment), versions two and three respectively. DSEE provides source code control, configuration management, release control, task management, advice management, and user-defined dependency tracking with automatic notification. DSEE is particularly well suited for managing large-scale (1+ million lines of code) software development. As such, it supports multiple development efforts working in parallel and/or in a distributed computing environment, maintains existing releases while working on new code, coordinates code and documentation, reduces time required to build a program, and stores references of which tools and versions of source code were used to create a binary of a program.

Other CASE tools include:

MAKE—a configurations manager designed to run on an AT&T UNIX programming environment, RCS—a source code control system that also runs on UNIX systems, CMS and MMS—a source code controller and configuration manager, respectively, for running on Digital Equipment Corp. computers, ALS—the Ada Language System, and Cedar System Modeller—for handling new module versions on the Xerox PARC Computer Science Laboratory System.

However, the foregoing CASE tools including DSEE versions two and three do not provide support for heterogeneous configuration management (HCM), i.e., configuration management among computers of different CPU type or which produce incompatible binaries.

SUMMARY OF THE INVENTION

The present invention provides a heterogeneous configuration management software tool. In particular, the present invention provides an improved DSEE for supporting HCM.

In a plurality of loosely coupled computers, including a first computer and a foreign computer, in a heterogeneous network, the present invention provides configuration managing means for building a user-desired software system in the network. According to one aspect of the present invention, the configuration managing means is executable on the first computer and enables at least one component of multiple components of the desired software system to be built (including translated) on the foreign computer.

In addition, the present invention employs a pool having first and second portions. The first portion holds bound configuration threads used in building the software system. The second portion holds derived objects from the foreign computer translation of system components. The first and second portions may reside on separate computers of the network (e.g., the first portion may reside on the first computer and the second portion may reside on a second computer), or on the same computer. In the latter case, the two portions may reside in different directories of the computer or in the same directory.

Similarly, releases or copies of the built system contain (i) the bound configuration threads used in the building of the desired software system, and (ii) the derived objects as stored on one of the computers of the network. These two parts (i) and (ii) may be in the same or different (separate) computer directories to form the release directory.

According to a second aspect of the present invention, the computers of the network are categorized into user-predefined host types. The first computer is of a different host type than the foreign computer. Further, each component of the desired software system is user-assigned a respective host type. Preferably the components of the desired system may be of different host types such that the system includes multiple host types.

In turn, the configuration managing means provides translation of each component by a computer of the respective host type. In addition, in response to a change in host type of a component, the configuration managing means provides that the component is translated by a computer of the newly assigned host type.

According to another aspect of the present invention, one of the network computers serves as a helper node. As such, to enable foreign computer translation of a system component, the configuration managing means initiates a build process on the helper node. And in response, the helper node establishes a shell build script for the foreign computer to translate the system component.

According to a further aspect of the present invention, each system component has a respective user-specified version. The configuration managing means employs a version indicator for providing to the foreign computer an indication of the user-specified version of the component to be translated by the foreign computer. Preferably the version indicator further provides the foreign computer the user-desired build attributes for building the system components. In the preferred embodiment, the version indicator is passed in pathnames. Specifically, the format of the version indicator in a pathname includes a directory path followed by a pointer name followed by the name of the system component to be built by the foreign computer (i.e., to by used by the foreign computer translator in building of the desired component). The configuration managing means passes such a pathname to the foreign computer. In addition the version indicator, or an equivalent, is available after the translations have completed. This aids in debugging and other analyses independent of translation.

In another aspect of the present invention, pathname transformation files provide transformation of a pathname in one computer of the network to a corresponding pathname in another computer of the network.

In accordance with another aspect of the present invention, a build manager is utilized. For each buildable component of the desired software system, the build manager selects a computer of the network to build the component. This is accomplished by the build manager managing a set of computers for the current host types and selecting one computer from the set. Where the selected computer is a foreign computer, the build manager invokes a shell process on the foreign computer to execute the translation script of the subject component.

In the preferred embodiment, invocation of a component build process involves three shells. A first shell is a user-specified or system-selected shell that is established by the log in procedure of a remote execution command in the network. A second shell serves as a standard shell in which the build manager can perform necessary set-up and clean-up tasks. A third shell is the user-specified shell associated with the component being built, and is established in the system model.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 7 is a schematic diagram of a file for defining a version switch object in the present invention of FIG. 2.

DETAILED DESCRIPTION OF THE PREFERRED EMBODIMENTS

Generally the software management tool of the present invention supports software system (e.g., application programs or program parts) building in a network of computers which produce different and perhaps incompatible binaries (i.e., a heterogeneous environment). Thus, apparatus embodying the present invention is referred to as an HCM software tool. Said another way, an HCM software tool of the present invention residing on one computer in a network of heterogeneous computers enables building software systems on itself or another computer in the network supporting the same or different type of binaries. In the preferred embodiment, the software management tool of the present invention is an improved version of DSEE which supports HCM in a network of Apollo Domain/OS and other computers.

Complete details of previous DSEE tools are found in U.S. Pat. Nos. 4,809,170 and 4,951,192 herein incorporated by reference. Brief details of those DSEE tools are repeated hereafter only as necessary for the understanding of the present invention.

As used herein, the term "software system" is the product being managed by the present invention HCM software tool, and in computer object terms is a directory tree which stores information about the entire system, such as its compiled system model, compiled threads and the pathnames of its releases. The term "building a system" refers to creating the product from its source materials and includes translating (i.e., compiling, binding, formatting or otherwise manipulating) source files and/or element versions.

Figure 1:
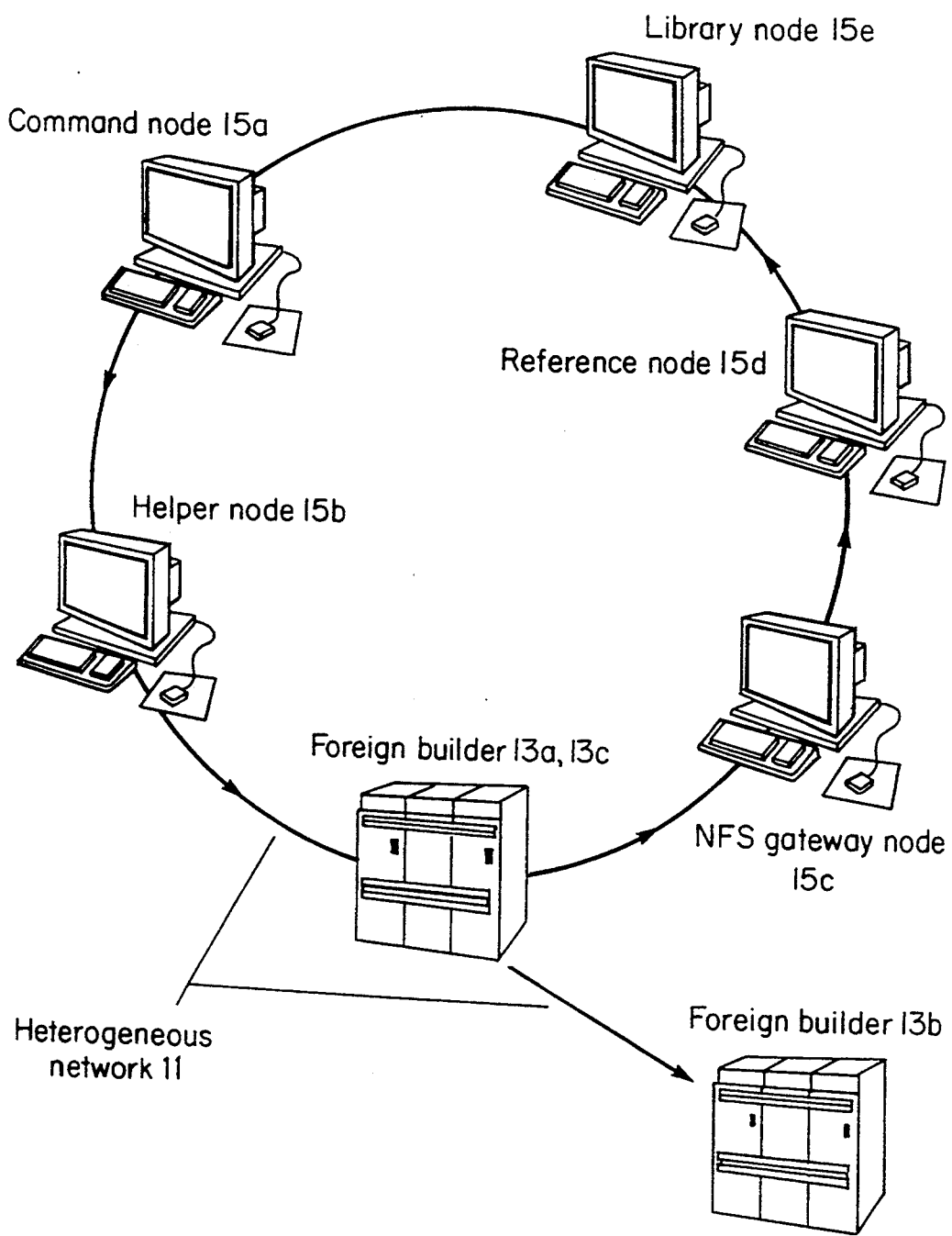
FIG. 1 is a schematic diagram of a network embodying the present invention.

FIG. 1 is illustrative of network 11 of computers embodying the present invention. It is understood that each computer does not necessarily handle or produce the same type of binaries (or have the same CPU type). For purposes of illustration and clearity, computers 15a, b, c, d, and e support the same type of binaries, while computer 13 a, b and c are dignital processors that support another type of binary, and hence are foreign computers. Other such foreign computers may be similarly included in the network although not shown. Further, as understood by those skilled in the art, computers, 15a, b, c, d and e may alternatively be one or multiple computers, as may 13a, b, and c. Residing on each computer 15 a, b, c, d, and e is an appropriate subcomponent of the HCM software tool 17 of the present invention.

Also in the preferred embodiment, residing on one of the computers 15 a, b, c, c, and e are all libraries and bound configurations threads of the HCM software tool 17, as made clearer later. Additionally, the working directory of the HCM softward tool 17 is also on one of the computers 15 a, b, c, d, and e.

Briefly by way of overview, one of the computers 15a is an acting command node (i.e., the computer from which the user/software engineer builds the desired software system). From this command node 15a, the HCM software tool 17 creates a process on computer 15b which serves as a helper node. This process on helper computer 15b creates and invokes a shell on the desired target or builder computer, for example, foreign computer 13a. Computer 15b passes the shell a translation script. The translation script andd translators invoked by the shell from computer 15b run on builder/-foreign computer 13a. During building, the translator running on builder/foreign computer 13a requests reading of files stored on oneof computers 15a, b, c, d, or e. To enable such reading of files remotely, a transparent file system server (such as an NFS server), runs on computer 15c which serves as a so-called NFS gateway node. The NFS gateway node 15c resolves pathnames of sources using a directory located on the reference computer (for example, computer 15d) and reads the files requested by the build translators. The HCM software tool 17 stores bound configuration threads (BCTs, described below) from the build, in a pool whose BCT section is on one of the computers 15a, b, c, d, and e. Tool 17 makes available a place for the translator to store the produced derived objects with the BCTs, or alternatively in a separately located derived object section of the pool. That is, tool 17 can split the pool by having the translator store its (the translator's) derived objects on one of the foreign computers 13b or in some other directory on one of computers 15 separate from the BCTs stored in one of the computers 15.

To perform a heterogeneous build, the HCM software tool 17 of the present invention requires:

(i) means for transparently reading and writing files to and from the foreign build computer;

(ii) means for starting a program, such as a shell, on the foreign build computer; and (iii) managers (sets of code that implement predetermined functions) to perform operations specific to the foreign computer and which may be dynamically loaded at run-time.

In the preferred embodiment, these requirements are satisfied with a transparent remote file system such as NFS (by Sun Microsystems Inc.), a build manager responsible for remote process invocation and other remote process issues, and an operating system manager responsible for pathname transformation and other operating system issues. Full details of these and other features of the preferred embodiment of the present invention are discussed next with reference to FIG. 2.

In the preferred embodiment, computers 15 of network 11 (FIG. 1) are Apollo computers running the Domain/OS operating system, and foreign computers 13 are running, for example, HP-UX, SunOS, or other UNIX or UNIX-compatible operating systems. Each computer 15, 13 of the network 11 is classified according to manufacturer, operating system, available translators, file system format, or any other user-desired characteristic/distinctions. Such classification can be used to effectively separate computers that support different binaries as well as to separate same binary computers according to power or other characteristics. The class to which a computer belongs is referred to as the host type of the computer. Each host type has a reference directory, an associated OS manager, and an associated build manager. The OS manager handles operating system services like pathname conversion from one file system syntax to another and managing derived objects. The build manager provides services like selecting the build computer from a prespecified list of candidates or querying a network resource broker for appropriate build computers, and starting complications on the selected computer. The OS and build managers run on computers 15a and b.

To implement the foregoing host type classification of network computers 15, 13, the present invention utilizes a host type file 19. Each entry in the host type file 19 defines a host type and its corresponding OS manager and build manager. Each type of desired foreign computer 13 (such as a Sun workstation) or particular type of Apollo computer (such as Series 10000 workstations to the exclusion of all other Apollo workstations) on which the user wishes a build to take place must be defined in the host type file 19.

In the preferred embodiment, each host type entry in the host type file 19 is a text string that reflects whatever distinctions the user wants to make between computers. Following the host type text string are the names of the corresponding OS manager and build manager. This enables users to create new host types freely. Host type entries can make very fine distinctions, like "DN4500 with FPA board", or broad groupings like UNIX. UNIX might be used for translators that produce portable output, like YACC or TROFF. The only host type that is predefined in the host type file 19 of the preferred embodiment is "apollo" with OS manager "domain_os" and build manager "dds".

The following is an example of a host type file 19:

| # /sys/dsee_config/hosts | | |
| --- | --- | --- |
| # | | |
| # host_type | OS mgr | build mgr |
| apollo | domain_os | dds |
| prism | domain_os | dds |
| dn4500_w_fpa | domain_os | dds |
| hp-ux | posix | rsh |
| sun | posix | rsh |
| unix | posix | rsh |

The default host type file is as follows:

| # sys/dsee_config/hosts | | |
| --- | --- | --- |
| # | | |
| # host_type | OS mgr | build mgr |
| # | | |
| apollo | domain_os | dds |
| hp | posix | rsh |

Figure 2:
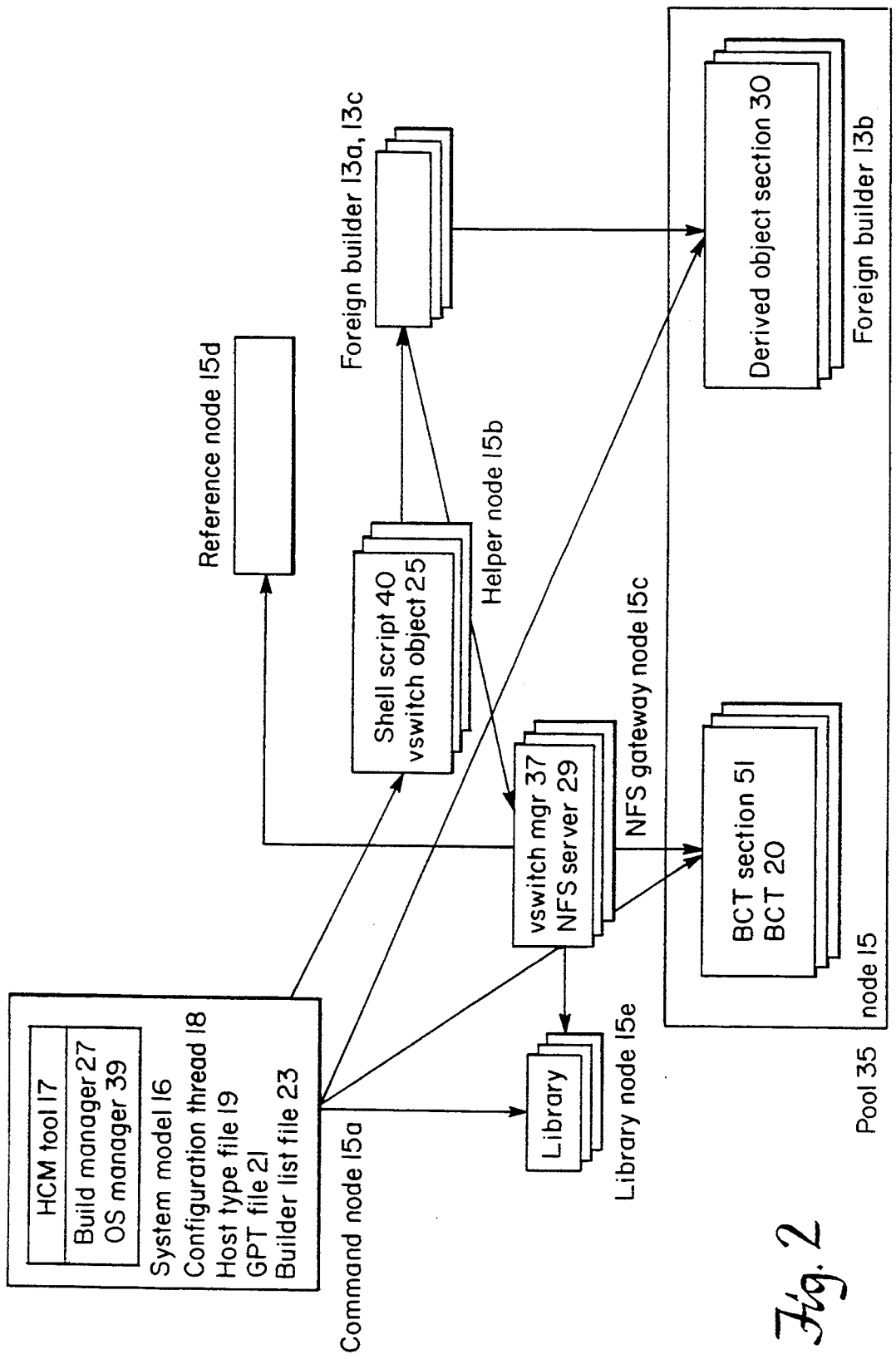
FIG. 2 is a block diagram of a preferred embodiment of the present invention in the network of FIG. 1.

A system build begins with a user specifying a system model 16 and configuration threads 18 on a non-foreign (i.e., Apollo) computer 15 as shown in FIG. 2. This computer becomes the command node 15a of the desired build. The system model 16 describes the structure of the desired software system (program or program part) and specifies the components of the desired system, their interrelationship and necessary attributes. The components of the system model 16 may either be internal or external files of HCM software tool 17. For each buildable component of the system, the system model 16 expresses:

i) source dependencies, i.e., what it "includes";

ii) translation rule, i.e., how to compile it;

iii) all possible translations options, e.g., -debug. -opt; as described later in detail, source files, binaries and options are referred to through macros that the HCM software tool 17 expands at build time;

iv) tool dependencies, i.e. tools required for the translation;

v) subcomponents that must be built first;

vi) host type of computer where the component must be built; that is, by designating a host type, the system model 16 specifies the class of computer on which the component's translation rule can be executed;

vii) which shell to use; and viii) which pool to use. Further, environment variables are inherited from the system model 16.

If the host type of a system model component is not declared, the default host type "apollo" is used. In addition, the host type may be specified in each individual buildable component block of the system model 16 or alternatively in a default declaration that applies to a group of components of the system model 16. The following example system model 16 illustrates the use of one such default declaration.

```
%var apollo hp-ux
alias
   %if apollo %then
      host = 'apollo';
      tools = '';
   %else
      host = 'hp-ux';
      tools = '/myproj/tools/hp-ux';
   %endif
```

-continued

```
library mylib = '/myproj/src';
pool mypool = '//apollo2/eliza/results';

default for ?*.c =
    host_type %expand(host);
    shell '/bin/csh_f';
    depends_tools
        '%expand(tools)/bin/cc';
    translate
        #%expand(host)
        %vswitch/%expand(tools)/bin/cc
        -I/usr/include -I%vswitch/myproj/src\
        -o %result %source
    %done end of ?*.c;
```

The sample system model utilizes an "alias" declaration in combination with preprocessor options. This allows the models to be written independent of a particular host type. Thus, with the sample system model, either "apollo" or "hp-ux" binaries may be built by enabling a corresponding system model parameter.

The default declaration in the above system model example specifies that all components ending with .c must be built on nodes with host type "apollo" (% expand(host)="apollo" from the alias declaration). Where a different translate rule is not needed for each component, the default declaration provides an efficient manner of generally specifying host type, translate rule, and other attributes of a group of system components.

Further, in the system model 16 each declaration to a library is required to be single slash "/" relative, i.e. start with a single slash. This single slash is interpreted relative to the "apollo" reference directory.

Continuing with FIG. 2, to begin a system build the user also provides a description of the versions and translator options desired to be used during building of each component in the system model 16. The descriptions form what are referred to as configurations threads 18 which are written in a rule-based language. Further, configuration thread rules may be explicit (for example, "use version 5"), or dynamic (for example, "use the most recent version"), or referential (for example, "use the same version used in REV2"), or contextual (for example, "use x.h[7] for P. otherwise x.h[6]").

To enable translators to obtain the appropriate versions of files as specified by configuration threads 18, a pointer (or working reference) to files is employed in the translate rules in the system model 16. In the preferred embodiment, references to the macro terms % source or % source_of provide paths from the builder/foreign computer 13 to source dependencies. And pointers generated by the macro term % vswitch are employed to provide paths from a builder/foreign computer 13 to the "apollo" reference directory.

During a heterogeneous build, the invention HCM software tool 17 expands the % vswitch term to the pathname from the root of the foreign computer 13 file system to a corresponding version switch object (vswitch object) 25. Tool 17 expands the % source and % source_of terms to pathnames from the root of the foreign computer 13 file system through the version switch object and ending in dependencies relative to the version switch object 25. Preferably the resulting pathname from a % source or % source_of expansion has the form path to version switch object/version switch object/
    path from "apollo" reference directory to object which leads to a source dependency of the component to be built and declared in the system model 16.

The vswitch object 25 (FIG. 2) is an operating system file that holds all information necessary to build a component of the desired system model 16. The HCM tool 17 forms the vswitch object/file 25 from the BCTs, system model 16 and global state including "apollo" and host reference directories and indication of builder computer (explained later). Specifically, included in the contents of the vswitch object 25 are interpretation details of pathnames, shell script information, and information about the build context from the command node 15a which is needed by the foreign builder/computer 13. The build context includes environment variables, specification of versions of all files under source control, file system directories to be used to interpret root-relative path names (i.e., a reference directory) and other desired build attributes.

During the build process, tool 17 also assigns the vswitch object/file 25 a unique pathname and identification number, and stores the file 25 in a temporary directory on a helper node 15b. To generate the unique identification number, tool 17 in the preferred embodiment makes an operating system call to obtain a network-wide unique number. Tool 17 converts the operating system number into a seven-digit base 32 equivalent. To the resulting number, tool 17 applies a standard alphabetical character to the beginning of the number. This produces an 8 character string that is acceptable as a file name on various operating systems.

Illustrated in FIG. 7 is a vswitch object file 25 of the preferred embodiment. As shown in FIG. 7 the vswitch object 25 has field 67 for indicating subject version of the vswitch object 25. A flag 68 indicates whether the vswitch object 25 is permanent. Record 69 holds the pathnames of the vswitch object, command node and a special directory on the command node. A record 70 holds the unique identification number of the corresponding version map and an indication of the computer on which the version map exists. Field 71 provides the computers 15 ("apollo") reference path. Field 72 indicates the host type of the subject component of the vswitch object 25. Field 73 indicates the foreign builder computer 13. Field 75 provides the reference pathname for the host type of the system component. Field 77 indicates the current working directory of the tool 17 process on the command computer. Field 79 provides the pathname to the shell used to interpret the subject translation rule and shell argument values. Field 76 provides environment variables and their values. Record 78 provides the translate script. Because the necessary space for environment variables and the translate script is unknown at the time the vswitch object 25 is created, fields 76 and 78 are fields of unfixed length. An indication of their respective lengths is stored in record 74. The vswitch object is created with file system permissions that prevent the object's deletion except from within HCM software tool 17 or using special Domain OS tools.

Further details of the vswitch object 25 will become apparent later.

Accordingly the vswitch object 25 represents the aspects of the build environment that are relevant to the configuration manager, including the "apollo" host type reference path, the set of environment variables specified in the system model 16, and version information specified by the configuration thread 18. During a build, a single vswitch object 25 represents this information for a single system component. Users can use a vswitch object 25 to access any object in the file system below the "apollo" reference directory, including symbolic links off the node and gateways to non-computer 15 file systems.

The translate rule in the previous sample system model 16 fragment is illustrative. The % vswitch term enables /bin/cc, which runs on a foreign builder/computer 13, to obtain include files stored in apollo_ref_path/myproj/src, where apollo_ref_path is the "apollo" host type reference path. Similarly, the pathname of the vswitch object 25 is inserted along with the system component pathname relative to the "apollo" host type reference path when the % source term is expanded.

Figure 3:
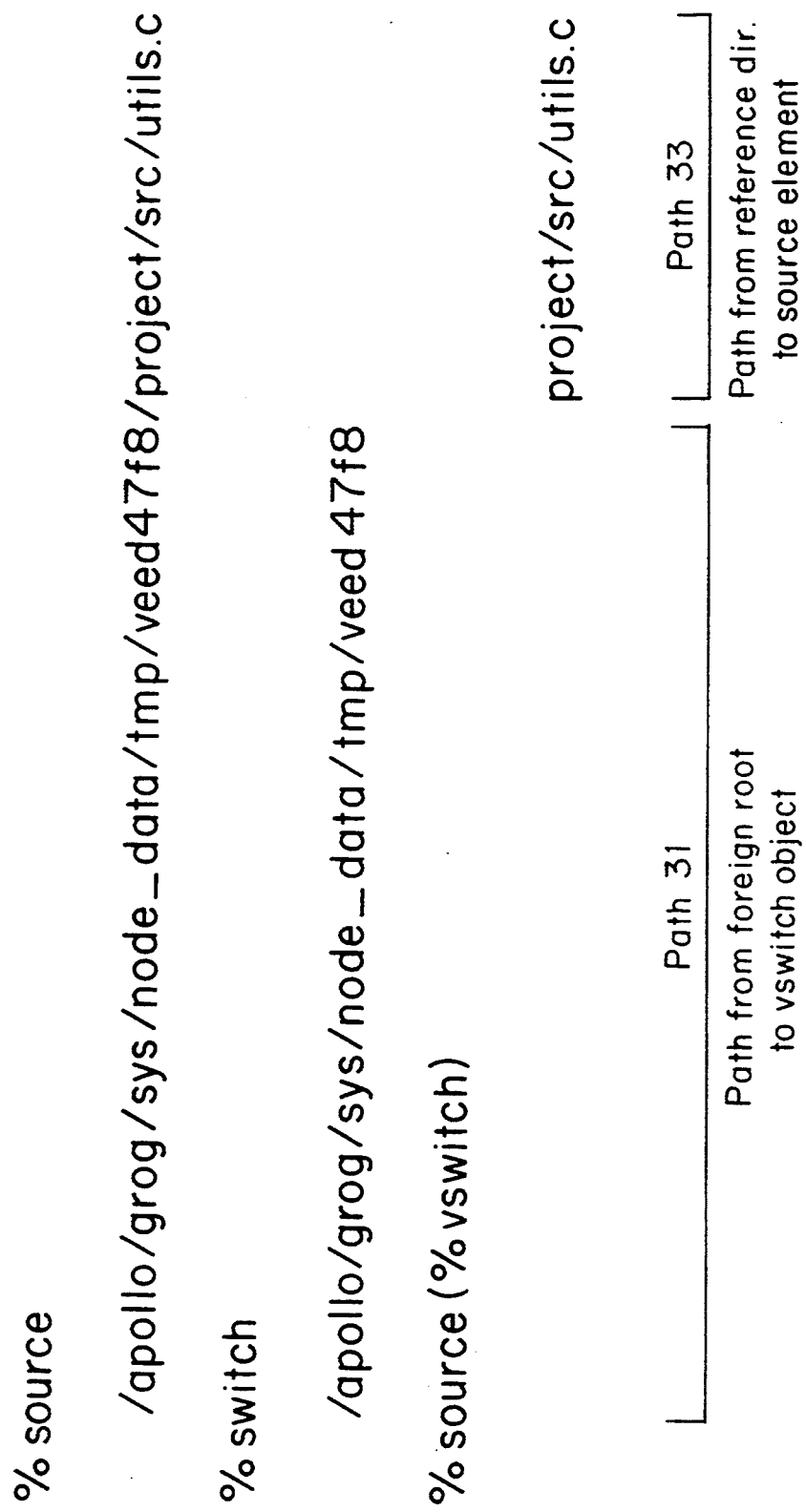
FIG. 3 is a schematic illustration of translate rule macros (or % constructs) employed in the embodiment of FIG. 2.

Additionally, the term %source(% vswitch) may be used in the system model 16. During a build, the invention HCM software tool 17 expands the term % source(% vswitch) to the pathname of a file or element relative to the "apollo" reference path. FIG. 3 is illustrative of the expansion of the terms % source, % vswitch and of % source(% vswitch).

As shown at the top of FIG. 3, in a heterogeneous build the term % source expands to a full pathname including a path 31 from a foreign root directory to the vswitch object, and a path 33 from the "apollo" reference directory to the source element. As shown at the middle of FIG. 3, the term % vswitch expands to path 31. And the term % source(% vswitch) expands to path 33, shown at the bottom of FIG. 3. Moreover, at the beginning of path 31 is the mount point of the network root of the Apollo file system (e.g., /apollo). Following that mount point is a pointer to the user-desired version. This pointer comprises (a) the pathname //grog/sys/node_data/tmp of a directory for temporary objects on the helper node 15b, and (b) the vswitch object name veed47f8. Effectively path 31 and hence the term % vswitch obtains the "apollo" reference directory.

As to the composition of path 33, the beginning portion (/project/src) is a library declaration as selected in the system model and the end portion (utils.c) indicates the component to be built. Path 33 is referred to as the residual.

To ensure that the two most common interpretations of the leading /, i.e., the root of the command node and the "apollo" reference path, are the same, the preferred embodiment employs symbolic links. Specifically, the preferred embodiment employs a link in the "apollo" reference directory and the root directory of each command node. The link points to a subdirectory through which the user accesses all of the build libraries. All root-relative pathnames in the system model 16 and configuration threads 18 are then written to begin with that link.

Additionally, the present invention enables a translation rule to reference the same tool or translator regardless of which foreign builder 13 the translation rule is running on. This is accomplished in one of the three following manners:

i) A % vswitch term is employed before the translator pathname. However, in the case where the translator invokes another translator, the translator pathname is preferably not preceded with the % vswitch term unless the translator accepts options that allow specification of the pathname at which subordinate tools are located. This is due to subsequent executions of executables located via the root relative pathnames not being passed through the vswitch object 25. Consider, for example, /bin/cc, which invokes the preprocessor /usr/lib/cpp. Although % vswitch/bin/cc refers to a C compiler stored on an Apollo workstation, the preprocessor that the c compiler invokes /usr/lib/cpp has a root-relative pathname, and thus, refers to the preprocessor stored on the foreign builder 13.

Some versions of the C compiler accept options that allow specification of the location of the C preprocessor. Those compilers can be used by specifying a pathname to the C preprocessor relative to % vswitch. In the case where the translator does not invoke another translator, the % vswitch term before the translator pathname ensures that whichever foreign builder 13 the translation rule is running on, the builder 13 uses apollo_ref_path/translator_path. However, because the builder 13 must access apollo_ref_path/translator_path through the transparent file system server, this may lead to an increase in build time, depending on the relative performance of the local foreign disk against the transparent file system.

ii) A link from the translator on all the foreign builders 13 to the translator of a single foreign computer is employed. This solution works for translators that invoke other translators, however it increases the time it takes to maintain the heterogeneous build environment as compared with the first solution and may lead to an increase in build time, depending on the relative performance of the local foreign disk against the transparent file system.

iii) The same version of the translator on all of the foreign builders 13 is maintained. This may result in faster builds than the previous two solutions, but maintaining the correct versions of translators would be more error-prone. However, if the translators are relatively stable and controlled, the problem of maintaining correct versions would be minimal.

It is noted that the % vswitch macro is used for heterogeneous building only. If the % vswitch macro is used in an Apollo translate rule or, in general, declarations for multiple platforms where a vswitch object is not necessarily created, then tool 17 expands the term to three slashes "///". The three slashes is the first sequence of path separator slashes which guarantee the same outcome on both Domain OS and other operating systems. This ensures that in all possible uses of % vswitch, it will be interpreted equivalent to the reference directory.

After a system model 16 and configuration thread 18 have been established (and are stored in working files of command node 15a), the HCM software tool 17 responds to a user input build command to invoke the desired system build. The HCM software tool 17 proceeds by combining the system model 16 and configuration thread 18 to make a desired bound configuration thread (BCT) 20 for each component of the proposed system. The bound configuration thread 20 is a permanent record of the options and versions (of sources and tools) used to build the respective component and other characteristics of the build context. The HCM software tool 17 looks into the user's binary pools 35, which are special directories where BCTs along with build results (i.e., binaries or derived objects) of previous builds are cached, and compares the BCTs 20 of the desired proposed system to the BCTs existing in the user's binary pools 35. From this comparison the HCM software tool 17 determines whether and which of any of the components of the specified desired software system have already been built.

Generally HCM software tool 17 makes this determination without regard to the specified host type of the desired component so that an existing BCT and the desired BCT 20 matching in all aspects except host type results in the component being determined to have already been built. To ensure that host type is considered and that tool 17 rebuilds a component for different values of that component's host type, the name of each component's host type is employed in a comment in the component's translation rule. One such comment is illustrated in the translation rule within the default declaration in the prior system model example. The illustrated default declaration is useful in the case where all of the components of a desired system use the same host type. The use of conditional processing variables in that example enables the host type of the builder to be easily changed through the editing of a model thread 18. The comment in the translate rule, i.e., # % expand(host), causes tool 17 to rebuild components ending in .c when the user changes host type in the model threads 18.

If the binary of a component is not found in a pool 35, then the HCM software tool 17 determines that a build is required for the component. The HCM software tool 17 arranges a sequence of builds, one build for each such component determined to require building, and determines which building tools are necessary. In particular, for each component that must be built the HCM software tool 17 looks to the host type specified for the component in the system model 16. The HCM software tool 17 confirms that there exist binary pools and helper nodes 15b that support the component's host type.

From the listing of the components host type in the host type file 19, the HCM software tool 17 obtains the names of the corresponding OS manager and build manager for that host type. The HCM software tool 17 loads the designated build manager 27 (FIG. 2) in local memory of the command node 15a if it has not already been loaded. Preferably, this is accomplished by tool 17 calling a procedure of build manager 27 which sets forth a list of the services provided by build manager 27. This list also provides addresses of the procedures that implement respective services and operations. Tool 17 uses those addresses to invoke procedures for desired operations. Tool 17 further records the addresses along with an indication of the loaded manager for each such dynamically loaded manager.

The HCM tool 17 passes to the dynamically loaded build manager 27, a builder list file 23 which contains a list of candidate foreign builders. In response, the builder manager 27 selects from the builder list file 23 a foreign builder computer 13 for each of the required-to-be-built components.

Figure 4:
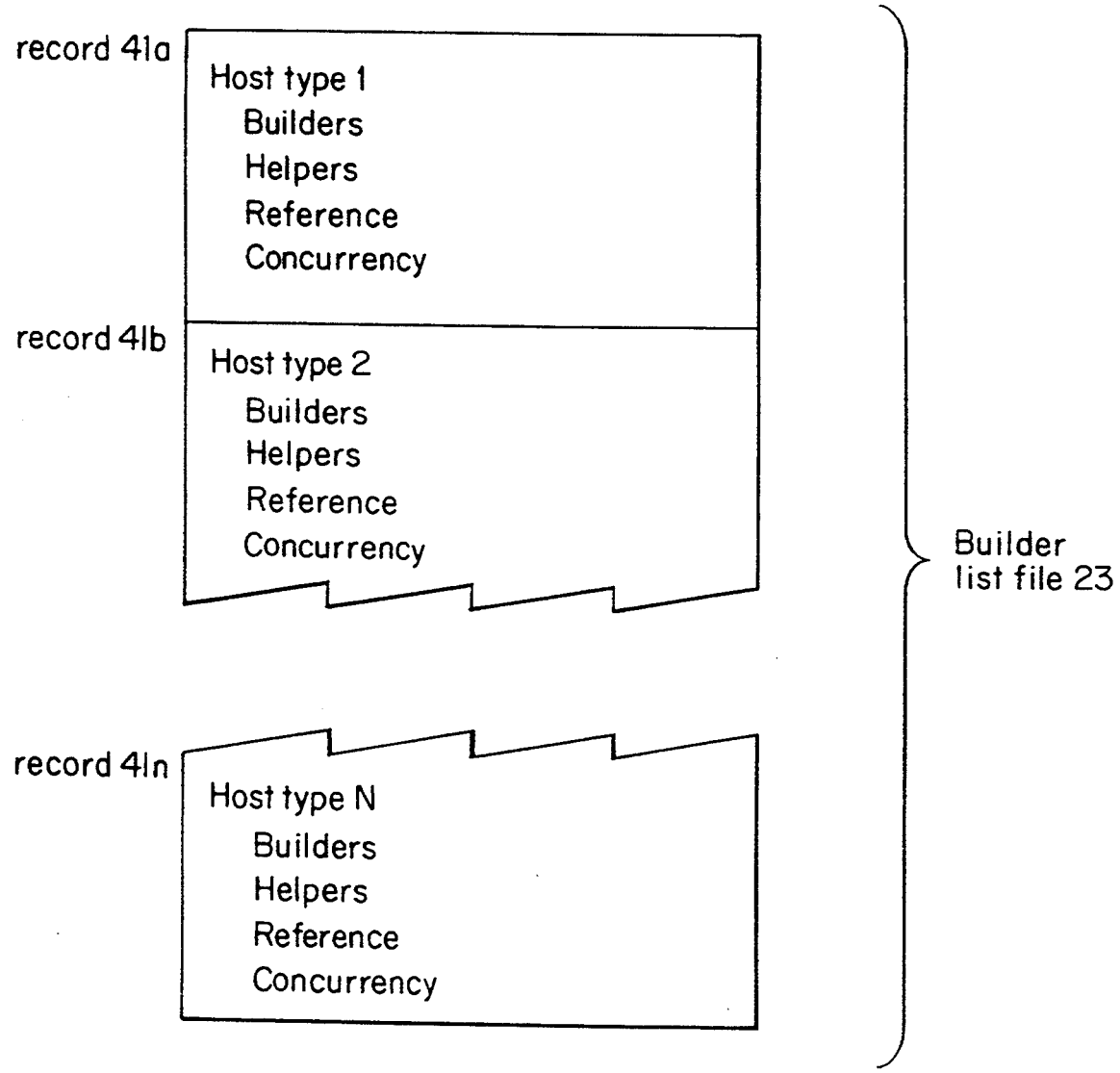
FIG. 4 is a schematic diagram of a builder list file of the present invention employed in FIG. 2.

In the preferred embodiment, the builder list file 23 is configured as follows and illustrated in FIG. 4. Generally, there is a separate entry in the builder list file 23 for each host type that can be built. For each entry in the list there is specified a list of candidate foreign builders, the host type of the builders, a reference path for the host type, available helper computers 15b for host types with a build manager that is not "dds", and an indication of the degree of concurrency (the number of simultaneous translations running on different computers) desired by the user. The builder list file 23 of FIG. 4 is arranged by host type. For each host type there is a record 41. Within the record 41 are listed candidate builders, helper nodes, a concurrency value and reference path corresponding to the host type.

The preferred defaults for builder list values are as follows. For host types whose build manager is other than "dds", the helper field defaults to the command node 15a; and the builder field and reference pathname field require entries from the user. For host types whose build manager is "dds", the builder field defaults to the command node 15a and the user is required to provide the reference pathname.

Preferably the default value of the concurrency field is 50 to indicate the number of possible concurrent builds that can be handled. The actual maximum number of parallel builds for a software system is the minimum of (a) number of parallel builds theoretically possible as inherent in the structure specified by the system model 16, (b) number of currently valid foreign builders 13, (c) number of currently valid helper nodes 15b, (d) the value of the concurrency field, and (e) the maximum concurrency permitted by the HCM tool 17.

The builder list file 23 may reside in one or more specific computer directories so that users may use a different set of build computers for each project they work on, have a personnel set of build computers, or use a builder last that has been standarized at their site. To that end the HCM software tool 17 first searches for the builder list file 23 in the current working directory of the HCM software tool process on command node 15a. If the tool 17 does not find the builder list file 23 there, then the tool 17 looks for the builder list file 23 in the user's home directory. If the tool 17 does not find the builder list file 23 there, the tool 17 looks to the "user_data" directory of the user. If the tool 17 does not find the builder list file 23 there, then the tool 17 looks for the builder list file 23 in the directory /sys/dsee/dsee_config. If the builder list file 23 is not found there, the build operation fails.

An example builder list file 23 follows.

```
apollo {
    builder: # faster builders first - list some twice
             //fast1 //fast2 //fast3 //fast4 //fast5
             //fast1 //fast2
             # now other builders
             //builder1 //builder2 //builder3 //builder4
             //builder5 //builder6 //builder7 //builder8
             //builder9
    reference: //reference
} hp {
    builder: hp-builder-1 hp-builder-2 hp-builder-1
             hp-builder-2
    helper: //helper1 //helper2 //helper3 //helper4
    reference: //reference
    concurrency: 2
}
```

As in FIG. 4, the above illustrated template provides candidate foreign builders 13 and helper nodes 15b grouped by host type. Any host type the user specifies in the builder list file 23 must be defined in the host type file. To reflect that foreign builders 13 have different capabilities and that different helper nodes 15b have different capabilities, the names of certain builders 13 and certain helper nodes 15b may be listed more than once in the respective builder and helper fields of the builder list file 23 and default file. The number of times the names of a foreign builder 13 or helper node 15b is listed in the respective builder and helper field for a given host type, indicates the relative power among the other foreign builders 13 or helper nodes 15b respectively.

Once the HCM tool 17 has located a builder list file 23, the tool 17 checks a flag or other indicator of the file 23 to determine whether the builder list has changed since the last component build. That is, in the preferred embodiment the builder list file 23 is dynamically changeable during building sessions. Foreign builder designations may be added or removed from builder fields of the file 23.

Upon receipt of the validated builder list file 23 and processor control, the build manager 27 selects a foreign builder 13 from the builder field under the host type of the subject component to-be-built. The HCM tool 17 selects a helper node 15b from the helper field under the host type of the subject component. In particular, for heterogeneous building foreign builder and helper node pairs are chosen until the build manager 27 reaches the end of the list of available foreign builders or other conditions (e.g., concurrencly limit) are met as discussed previously. The build manager 27 then chooses foreign builders 13 as they complete builds. The build manager 27 chooses foreign builders 13 using a modified round-robin method, limiting the number of simultaneous builds on a particular foreign builder 13 to the number of times the name of the builder appears in the builder field.

For example, in the default builder list above, for the host type "apollo" the build manager 27 performs the first seven builds using the foreign builders in the following order: fast1, fast2, fast3, fast4, fast5, fast1, fast2. The build manager 27 starts the eighth build however on the first foreign builder 13 on which a build completes. Additionally each successive build starts on the next foreign builder 13 which completes a build. The helper node 15b of the first build (fast1) is chosen from the list of helper node names in the helper field in a manner that parallel builders in homogeneous building were chosen in U.S. Pat. No. 4,951,192, herein incorporated by reference.

After selection of builder and helper computers, tool 17 checks for validity of the selected computers. If there exists an invalidity, such as the user is not authorized for that builder computer or helper computer, or the builder computer or helper computer is inaccessible, or the builder computer or helper computer is not properly configured, then tool 17 marks the computer to indicate the invalidity/unsuitability of the computer. The computer remains so marked until a new builder list file 23 is established. The processing of the system model component is then requeued and a new builder computer or helper computer is selected as needed.

After the build manager 27 has selected a valid foreign builder 13 and helper node 15b pair, the build manager 27 returns control to tool 17 running at the command node 15a. Tool 17 generates a vswitch object 25 on the chosen helper node 15b for the subject component as described previously. In effect, tool 17 thus passes from the command node 15a to the build manager selected helper node 15b, the build context via a vswitch object 25.

After tool 17 has created the vswitch object 25 on helper node 15b, the HCM tool 17 running on helper node 15b loads into local memory and invokes the build manager 27. This includes passing the build context (via vswitch object 25) to the build manager 27. Before passing translate rules to the build manager 27, the instance of tool 17 running on the command node 15a expands any % constructs used in the translate rules as discussed previously in FIG. 3. In turn, the build manager 27 creates a shell script 40 from the expanded translate rule. In the shell script 40, the translate rule is preceded by shell commands to set characteristics of the build context, such as the working directory, and system model and the make_visible environment variables. Also in shell script 40, the translate rule is followed by shell commands to preserve the exit status of the translate shell and by other neccessary clean-up procedures.

In the preferred embodiment, the shell script 40 is a file which contains the translation script and code that sets up the system model and make_visible environment variables and exit procedures for the build. The shell script 40 also sets the working directory to the working directory of the HCM software tool 17 process on command node 15a. And where possible, the shell script 40 changes the interrelation of leading slashes to be relative to the reference directory of the host type of the component being built. The shell script 40 also includes references to the vswitch object 25.

It is noted that the purpose of the vswitch object 25 and previously described % constructs here are key. In particular, the previously described % constructs and the corresponding vswitch object 25 provide paths from a foreign builder computer 13 to source dependencies and a path from the foreign computer 13 to the root of the "apollo" reference directory. The vswitch object 25 and % macros accomplish this by holding places in the lines of translate rules for one or more pathnames to be supplied at translation time by the HCM software tool 17 during a build, and by giving names to particular instances provided at later times.

Continuing with the description of a build as illustrated in FIG. 2, build manager 27 establishes a translate shell on the selected foreign builder computer 13 to execute shell script 40. Preferably, three shells are utilized to load execution on foreign builder 13. A first shell is established by the network 11 in response to the build manager 27 remote invoking (via a network command) a script on foreign builder 13. This shell provides a working area on foreign builder 13. For example, the system shell /etc/passed is utilized on UNIX operating systems. Because each shell has its own context and the build manager 27 has no prior knowledge of the build context of the first shell as established by the network 11, the build manager 27 establishes a second shell within the first shell. The second shell is able to interpret build manager commands and thus serves as the standard shell in which the build manager 27 performs the necessary set-up and clean-up tasks. For UNIX operating systems, the shell /bin/sh is used. The third shell employed is the user-specified translation shell associated with the component being built and is specified in the system model 16. This is the shell in which foreign computer 13 executes shell script 40.

After the translate shell is established on the foreign builder computer 13 by the build manager 27, the shell is run on the foreign builder computer 13. During the running of the shell, a compiler or other translator is invoked. Subsequently the invoked translator issues a request to read a file, such as an include file or source file, that exists on some computer 15 of the network 11. The foreign computer 13 recognizes the requested file is not a local object and transmits the pathname of the requested file, which includes the now-expanded unique identifier of the involved vswitch object 25, to the NFS server 29. Other transparent file servers besides NFS server 29 are suitable. The transmitted pathname for % source has the form Apollo mount point/vswitch object pathname or pointer to version/library declaration/component name.

Effectively the NFS server 29 reads and interprets one part of the passed pathname at a time. For each part, the NFS server 29 interrogates what type of object that portion references (e.g., a directory, file, etc.) and what information it contains. Preferably the interrogation is performed through type-specific object managers. The object manager responds to the NFS server 29 by providing a list of objects to verify existence of objects corresponding to parts of the pathname. When the NFS server 29 interrogates the pathname portion comprising the vswitch unique identifier, the operating system determines that the vswitch object 25 is indicated. In response, the operating system loads the vswitch manager 37 into the same process space as the NFS server 29. To that end, the vswitch manager 37 runs in the same process as the NFS server 29.

The vswitch manager 37 takes the vswitch unique identifier and reads it. As described previously, the build context exists in the referenced vswitch object 25. To that end, the vswitch manager 37 changes the interpretation of leading slashes in pathnames to the "apollo" reference directory and sets the environment variables requested in the system model and make_visible environment variables and sets the version map environment variable which points to a file containing version specifications. Preferably vswitch manager 37 compares the values of the currently set environment variables to the user-desired values indicated in field 76 of vswitch object 35. If the values are different then vswitch manager 37 records the current values of the environment variables and changes the values to equal those specified in field 76 of vswitch object 25. If necessary vswitch manager 37 adds any lacking environment variables and records this addition.

The NFS server 29 allocates a handle to store the recorded information and pathname generated by vswitch manager 37. Next the vswitch manager 37 takes the residual portion (e.g., library declaration and component name) of the passed pathname and opens it. To accomplish this, the vswitch manager 37 presents the "apollo" reference path 71 from vswitch object 25 to obtain a pathname relative to the "apollo" reference directory.

The operating system then dynamically loads the type manager for the residual into the process space of the transparent file system server 29 and passes the handle to the just-loaded type manager which treats it as a new open request. If the object pointed to by the residual pathname is a tool 17 element, the case_hm manager is loaded. The case_hm manager looks for the version map environment variable and uses it to retrieve the desired version of the element/object as described by the version map pointed to by the version map environment variable.

The case_hm manager then returns a handle to the vswitch manager 37 which in turn includes that handle in its (vswitch manager) handle which the vswitch manager 37 returns to NFS server 29. The handle returned to NFS server 29 by the vswitch manager 37 represents pathname of vswitch object, pathname of "apollo" reference path, residual, unique identifier of vswitch object 25, pointer to vswitch object in memory, flag indicating whether vswitch object 25 is permanent or temporary, and unique identifier of actual file opened. If the resultant pathname includes a symbolic link, vswitch manager 37 replaces the link with the pathname to which the link points.

After the type manager has completed the open request, the handle is passed back to vswitch manager 37. In response, the vswitch manager 37 undoes the changes it initially made in reading the vswitch object 25. That is, the vswitch manager 37 changes the interpretation of leading slashes in the pathname back to their initial reference, clears the version map environment variable, resets environment variables to their initial values recorded in the vswitch manager 37, and deletes any environment variables which were added for this read and recorded in the vswitch manager 37.

In turn, builder computer 13 receives confirmation that an object was opened in response to the open request. Included in the confirmation is information regarding the actual object opened, e.g., whether it is a file or directory, the traits supported by it, etc. Further, most subsequent I/O requests against the opened object (file) are processed through the foreign builder operating system to the underlying object manager without involvement of the vswitch object 25 and corresponding manager 37. Some operations require involvement of the vswitch object 25 and manager 37. These operations through the vswitch object 25 act as much as possible as if they are performed relative to a reference directory. Two exceptions exist. The Inquire Name operation employs an input pathname which includes a vswitch object to ensure that the correct version of the subject is obtained. In the Close operation, the close request is passed to the file manager of the file to be closed. If the file was opened with a permanent vswitch object, then the close operation must close the permanent vswitch object too.

Any requests for non-Apollo objects (files) are satisfied by the builder computer 13 directly.

In order to convert pathnames that are relative to the root directory of one computer into pathnames that are relative to the root directory of another computer, GPT configuration files 21 (FIG. 2) are employed. In the case where one of the two computers in question is a Domain/OS computer, the pathname may be relative to the Domain network root //. In the preferred embodiment, there is a different GPT file 21 for each OS manager. Preferably OS managers 39 use GPT files 21 to obtain operating system pathnames. The build managers 27 use GPT files 21 to obtain pathnames for system builds.

That is, the present invention provides means for transforming pathnames interpretable by one computer system to pathnames interpretable by another computer system in a network of computers coconnected by a transparent file system. Other implementations of such means alternative to the GPT files 21 are suitable.

Figure 5:
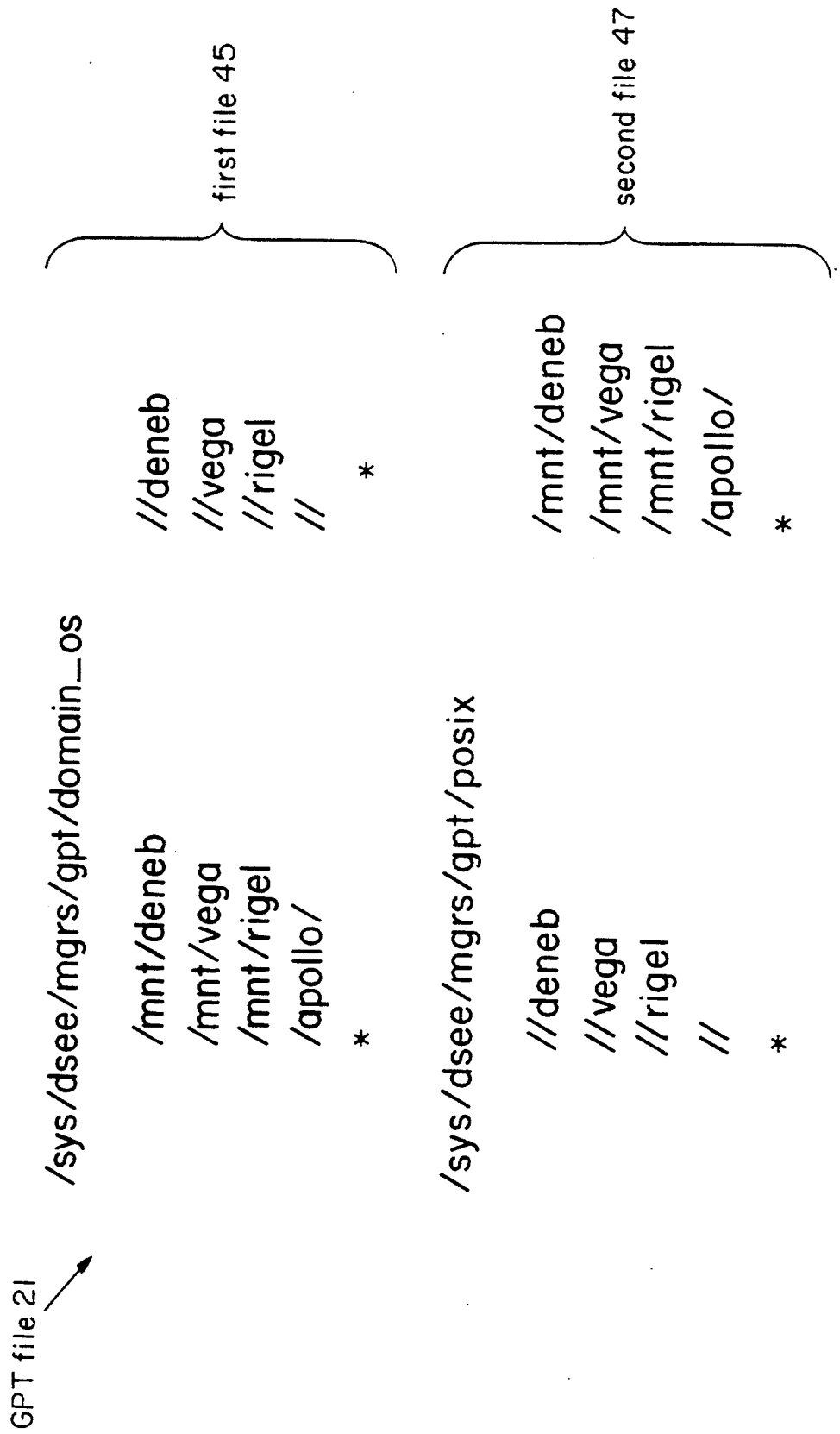
FIG. 5 is a schematic diagram of a general pathname transformation file of the present invention employed in FIG. 2.

In the preferred embodiment there are two related GPT configuration files 21 as illustrated in FIG. 5. First, file 45 provides transformation to Domain/OS computer pathnames used both for Domain/OS to Domain/OS and foreign computer to Domain/OS transformations. In particular, each entry in the first file 45 is a text string or regular expression representing part or all of a pathname to be converted to a Domain/OS pathname. Following that text string is a text string or regular expression which is to substitute for the source text string or regular expression. To that end, the OS manager 39 checks the first GPT file 45, one entry at a time, in the illustrated top-down order, for a match to a subject pathname. Where the subject pathname matches part of an entry, the OS manager 39 uses the corresponding translation, i.e., substitute text string or regular expression, of that entry in the subject pathname. Subsequently the HCM software tool 17 may use the substitute pathname to access Domain/OS objects.

The second GPT file 47 of FIG. 5 provides translation to foreign computers pathnames either from other foreign computer pathnames or from Domain/OS pathnames. Use by the OS manager 39 and operation of the second GPT file 47 of FIG. 5 is similar to that of the first file 45 described above. Further, the last entry (* *) of each of the GPT files 45, 47 of FIG. 5 indicates that if the subject pathname does not match any explicit text string or regular expression of the GPT file then no change in pathname is made. Without this last entry an error would have been given by tool 17 and the process terminated.

An example of the foregoing reading of a pathname of a "Domain/OS" object from non-Apollo host type computers (foreign builder computer 13) and converting of pathnames through GPT files 21 to obtain a desired file is provided next. Given the translate rule

```
TRANSLATE
/bin/cc/-0 %result %source

%DONE
``` in the system model 16 where the Apollo network mount point is /mnt/apollo; the helper node 15b is //hlp; the library supporting tool 17 is /dsee/work/lib; the system component or element is file. c; and the reference path for host type "apollo" is //ref_node, an invoked build proceeds as follows.

Tool 17 on command node 15a creates a temporary vswitch object 25 with the unique identifier v1234567, in the directory /sys/node_data/tmp on the helper node 15b. Therefore the path to the vswitch object 25 is //hlp/sys/node_data/tmp/v1234567.

Before execution of the translate shell on foreign builder 13, the tool 17 replaces the term % source of the translate rule with //hlp/sys/-node_data/tmp/v1234567/dsee/work/lib/file.c. The dynamically loaded OS manager 39 uses the GPT configuration file 47 to translate the Apollo pathname into a pathname that a process on foreign builder 13 can use. The resulting pathname is /mnt/apollo/hlp/sys/-node_data/tmp/v1234567/dsee/work/lib/file.c where /mnt/apollo is the mount point of the Domain network root; /hlp/sys/node_data/tmp/v1234567 is the path to vswitch object from the Domain network root; /dsee/-work/lib is the pathname of the supporting library relative to the reference directory; and file.c is the subject element.

The resultant pathname is accessed on foreign builder 13. Since the pathname begins with the mount point of the Apollo network root, the operating system on the foreign builder 13 requests, via NFS server 29, to read the file from the Apollo network. When the vswitch object (//hlp/sys/node_data/tmp/v1234567) is encountered, the vswitch manager 37 reads the temporary vswitch object 25 (v1234567) on helper node 15b. Next the vswitch manager 37 changes the interpretation of a leading / in a pathname to be the reference path 71 (FIG. 7) from vswitch object 25 (v1234567) and opens the residual /dsee/work/lib/file.c. This yields the equivalent of an ordinary Domain/OS (Apollo computer) pathname //ref_node/dsee/work/lib/file.c, so the supporting library is reached and the desired element can be read.

The vswitch object 25 (v1234567) exists only for the duration of the build. When the build is complete, tool 17 deletes the vswitch object 25.

Returning to FIG. 2, after reading Apollo objects through the NFS server 29 and non-Apollo files, the translate shell running on the foreign builder computer 13 writes the resulting binaries. In the preferred embodiment the foreign builder computer 13 writes the resulting binaries or derived objects in a derived object section 30 of the pool 35 which holds BCT's 20 in a BCT section 51. The pool 35 is formatted as either a unified pool where sections 30, 51 are within the same directory subtree in the pool directory tree, or a split pool where sections 30, 51 are placed outside of the pool directory subtree and the subtree is referenced by the pool directory.

In particular, in the case of a split pool 35, the derived object section 30 resides on foreign computer 13 and is pointed to by the BCT section 51 of pool 35 residing on the Apollo computers 15. For other built components of different host type, other derived object sections which correspond to the BCT section 51 of pool 35 are created on other computers and/or in different directories of apollo computers 15. Restated in the preferred embodiment split pools, as opposed to unified pools, are employed where the BCT section and derived object section(s) reside in separate directories and perhaps on different computers.

Split pools enable information loss to be eliminated between incompatible file systems by eliminating the transfer of information from foreign computers to Apollo computers and back. Further, split pools may enjoy the benefits of existing foreigh computers, e.g., local disk or network performance or fault-tolerance.

The split pool 35 is created in connection with the BCT pool section 51 on an Apollo computer 15. The BCT section 51 can point to several derived object sections 30. Each derived object section is associated with one host type, and each host type is supported by at least one derived object section 30 or pool 35. In particular, pointers from the BCT section 51 are established and each indicates the pathname of the derived object section on a foreign computer 13 or a different apollo computer 15 directory. A subsequent reference to the split pool 35 is by the pool name, which is the pathname of the BCT section 51. Subject host type is then used to determine which associated derived object section 30 is to be used. Thus, in the system model 16, the pool declaration (description of pool to use for each component) provides the BCT section pathname and from that BCT section pointers are used to the pertinent derived object sections. When the pathname of a derived object section is used, it is stated as an apollo relative pathname. The GPT files 21 are used if the pathname is needed relative to a foreign computer 13.

To support the foregoing, there is an administrative directory in the BCT section of pool 35. This directory contains a list of host types supported by the pool 35, and for each host type specifies (a) pathname of the respective derived object section relative to apollo computer 15 and (b) the directory containing additional information about the derived object section that the corresponding OS manager desires to maintain.

Also to ensure uniqueness of pathnames of objects in the pool 35 a hierarchy of parts in the pathnames relative to supporting library and file is established. This is accomplished as follows. During a build, a separate directory for each supporting library (or aggregrate where libraries are not used) is created. Within each directory, a subdirectory for each element built is created as the element is built. The BCT's of the element (or aggregate) are made to reside within the subdirectory created for the element (or aggregate). The pathname of each BCT is then formed by the combination of (1) element host type in ascii characters, and (2) relevant element characteristics, i.e., versions, compile options and tools used to build the element hashed together. Hash collisions are resolved by chaining. Pathnames to derived objects of the element are similarly derived from hash values. These hash values are stored as part of the names of subdirectories created for the elements.

A default pool exists on the Apollo computers and is a unified pool which supports the "apollo" host type.

In one embodiment, each of the foreign computers is mounted to the Apollo computer 15a at the // level. Mounted in this manner each foreign computer is able to access objects on another computer through the Apollo computer.

Figure 6:
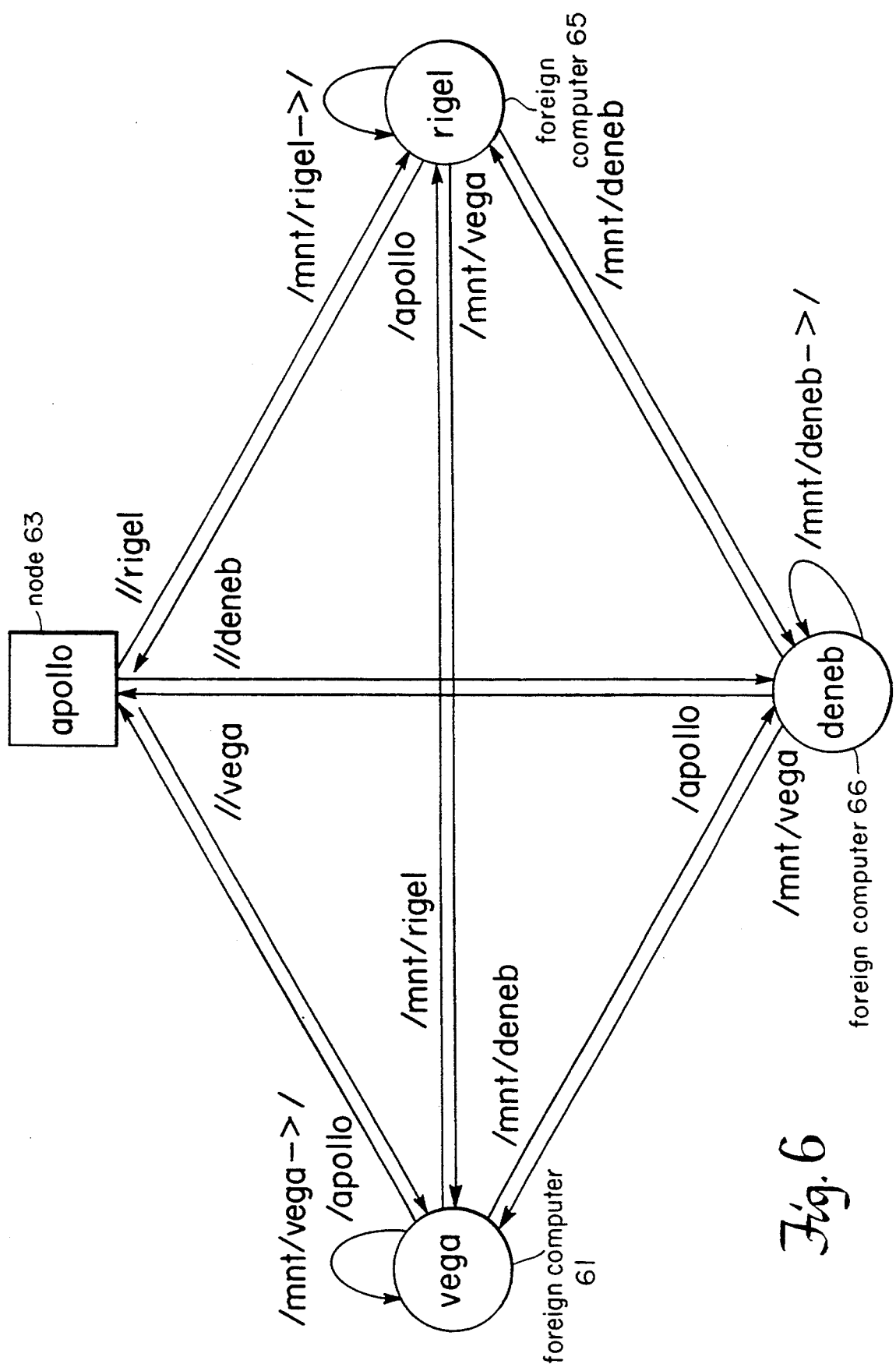
FIG. 6 is a block diagram of a heterogenous network illustrating mounting arrangement used in the preferred embodiment of the present invention.

An example is illustrated in FIG. 6 where foreign computers vega 61, rigel 65 and deneb 66 are each mounted at the // level to the Apollo computer 63. Each foreign computer 61, 65, 66 mounts the other foreign computers using the same format for each such that the mounts are symmetrical. A symbolic link is also created from each foreign computer 61, 65, 66 to itself, so that the foreign computer can access files on itself with a pathname that is similar to pathnames used to access objects on the other foreign computers. On operation systems where symbolic links are not available, mount points or similar capabilities are used. Further the symmetry makes path transformations for GPT files 21 easier to write.

After source code has been formulated by the present invention, source code level of debugging may be employed. As described above during a build the vswitch object feature is needed to incorporate build context from a command node 15a to a foreign builder 13. But when the build is completed the original vswitch no longer exists. However, a version switch is needed for debugging purposes in order to reestablish the build context utilized during the build, so that the user obtains the same version of source files in the debugger as were used during the build. The present invention provides "create environment" and "set environment" commands to create a more permanent version of vswitch object 25 and version map for the build context used in a build. The "apollo" reference directory should be determinable from the BCT's, and if not then the current "apollo" reference directory is utilized.

Besides being used to obtain versions used during a build, the "set environment" command may be used to obtain an arbitrary set of versions. When the command is used in this fashion, the current "Apollo" reference directory and the environment variables in the current system model are used in the created vswitch object 25.

In response to the create environment command, the processor looks up the build in the user's pool 35 or release directory and finds the versions used and other characteristics of the build (environment) and creates a corresponding version switch and version map. The debugger must have an option or command that allows the user to specify in what directory or directories the source code for the file being debugged is located. If this option or command is used to point to the appropriate subdirectory or subdirectories of the version switch, the desired version of each source component can be read using the same mechanism disclosed previously. HCM tool 17 also creates a shell that has an environment variable that points to the version map. Each tool 17 element read in the shell is assigned versions specified in the corresponding version map. As soon as the shell is exited the version switch object and version map are deleted.

The "set environment" command is similar to the "create environment" command in that it provides a corresponding version map and version switch for a built component. However, the "set environment" command creates a permanent version map and vswitch object, and no shell is created. The version map and vswitch object are deleted only upon an explicit user command from the HCM software tool 17.

A release or permanent snapshot of the software system build for archiving or transmission purposes is accomplished as follows. Each release needs to capture the BCT's and binaries of the subject software system. Also included in the release may be source code, system model, and tools used to build the system. If the source code, system model, and tools are stored under the invention HCM tool 17 then the BCT's are sufficient for the release to rebuild the system exactly. Otherwise the release must include the source code, system model and tools. Also each release has a release directory. The directory is of either a split or unified format to support a split or unified release, respectively. In a unified release directory, there are the BCT's and all corresponding derived objects from split or unified pools. In a split release directory, there are the BCT's and pointers to the corresponding derived objects which reside in another directory of the release computer or on another computer.

While the invention has been particularly shown and described with reference to a preferred embodiment thereof, it will be understood by those skilled in the art that various changes in form and details may be made therein without departing from the spirit and scope of the invention as defined by the appended claims. For example, parallel building of independent system components may be employed as described in U.S. Pat. No. 4,951,192 but with the present invention distribution among foreign and apollo computers in a heterogeneous network.

In addition, increased performance is provided by the use of caches throughout the present invention. One cache, preferably an LRU (least recently used) cache holds vswitch objects 25 indexed by unique identifier. That is, although there is one vswitch object per component being built, in the course of compiling a component the NFS server 29 may need to open several files by reading the same vswitch object many times. With the vswitch object in the LRU cache along with an indication of the last time the vswitch object was used, the vswitch manager 37 determines whether it has already opened the vswitch object, by looking in the cache under the unique identifier of the vswitch object. If the vswitch object is not in the cache and hence not previously opened by the manager 37, then the manager 37 opens the vswitch object as described previously.

If the cache is full, vswitch manager 37 deletes the least recently used entry according to the indications of last use time of the entries, and inserts a new entry for the newly opened vswitch object. Further, a predetermined time threshold is employed. During a call to open a vswitch, the times of last use of all cache entries are compared to the time threshold. Those entries with times older than the threshold are purged. Permanent vswitch objects do not participate in the cache.

A second LRU cache is employed by the present invention to hold certain file information. During building, certain file attributes are questioned many times even though these attributes do not change. The second LRU cache holds the results of those often-asked questions regarding unchanging file attributes, along with an indication of respective date/time that the answer was given. Thus, instead of searching files or directories for the answers to these questions, the present invention refers to the second LRU cache. Generally the cache is searched by hashing the unique identifier of the object. In the preferred embodiment entries in the cache include length of file (in bytes), reference count of file (number of reference names), number of blocks on disk the file occupies, creation time, file modification times, last time file accessed, time of change of file attribute, and protections on the file (i.e., who has read, write, modify, delete rights to the file).

What is claimed is:

1. Apparatus for heterogeneous building of computer software comprising:
   a plurality of computers loosely coupled in a network, at least one computer in the plurality of computers being a foreign computer with respect to a first computer in the plurality of computers such that said network is heterogeneous;
   a configuration managing member executable on the first computer for building a user desired software system in the heterogeneous network, the software system having a multiplicity of components, each component being derivable from a respective source element, the configuration managing member building the software system by deriving each component from its source element including, for each component, the configuration managing member having one of the computers translate the source element of the component to form an output element from that computer, the configuration managing member enabling at least one component to be translated by the foreign computer to generate a foreign computer output element of the one component, such that one of the first computer and foreign computer combines output elements including foreign computer output elements of the software system components to build the desired software system.

2. Apparatus as claimed in claim 1 further comprising a pool having a first portion for holding in one computer directory bound configuration threads used in building the software system and a second portion for holding in a second directory derived objects from the system component translation by the foreign computer such that bound configuration threads are stored separately from foreign computer derived objects.

3. Apparatus as claimed in claim 2 wherein the one computer directory resides on one computer of the network and the second directory resides on another computer in the network.

4. Apparatus as claimed in claim 2 further comprising a release directory formed of a first part and a second part, the first part for containing bound configuration threads used in building the desired software system and the second part for containing derived objects held in the pool second portion, the first part and second part residing in one of a common computer directory and separate computer directories.

5. Apparatus as claimed in claim 1 wherein the computers of the network are categorized into user-predetermined host types, the first computer being of a different host type than the foreign computer.

6. Apparatus as claimed claim 5 wherein each system component is user-assigned a respective host type such that the component is translated by a computer of the assigned host type.

7. Apparatus as claimed in claim 6 wherein in response to a change to a different host type of a component the configuration managing member provides that the component is translated by a computer of that host type.

8. Apparatus as claimed in claim 6 wherein the components of the system are of different host types such that the desired software system comprises components of mixed host type.

9. Apparatus as claimed in claim 1 wherein one of the computers including the first computer in the network is a helper node;
   the configuration managing member enables a component to be translated by the foreign computer by initiating build process on the helper node and in response the helper node establishes and invokes a shell build script for the foreign computer to translate the system component.

10. Apparatus as claimed in claim 1 wherein the components of the software system are of respective user-specified versions; and
    the configuration managing member employs a version indicator for providing to the foreign computer an indication of the user-specified version of the component to be translated by the foreign computer.

11. Apparatus as claimed in claim 10 wherein the version indicator further provides the foreign computer a set of user-desired build attributes for building the software system.

12. Apparatus as claimed in claim 10 wherein the version indicator is passed to the foreign computer in a pathname.

13. Apparatus as claimed in claim 12 wherein the version indicator comprises a pointer name, and the pathname passed to the foreign computer comprises a directory path followed by the pointer name followed by name of the component to be translated by the foreign computer.

14. Apparatus as claimed in claim 1 further comprising a pathname transformation file for providing transformation of a pathname in one computer of the network to a corresponding pathname in another computer of the network.

15. Apparatus as claimed in claim 1 further comprising a build manager for selecting, for each component of the desired software system, a computer of the network to build the component.

16. Method of building a desired software system having a multiplicity of components, each component being derivable from a respective source element by translation of the source element to an output element, the method comprising the steps of:

providing a plurality of computers in a heterogeneous network, one computer being a foreign computer that generates binaries different from binaries generated by other computers of the network;

for at least one component of a software system desired to be built in the network, invoking a translation process on the foreign computer such that a foreign computer output element of each of the at least one component is generated from the respective source element of the one component;

for each remaining component of the desired software system, translating the source element of the component on another computer of the network to generate an output element from that computer for the component;

combining output elements, including foreign computer output elements of the software system components to build the desired software system; and storing binaries of translated source elements of the components on one of the computers of the network.

17. A method as claimed in claim 16 wherein the step of invoking a translation process on the foreign computer includes:

establishing a first shell on the foreign computer;

within the first shell providing a second shell in which set-up and clean-up tasks of the translation process are performed; and executing the translation process in a third shell.

18. A method as claimed in claim 16 further comprising the step of forming a release directory having a first part containing bound configuration threads used in building the desired software system and a second part containing a copy of the binaries, the first and second parts residing on one of a common computer directory and separate computer directories.

19. A method as claimed in claim 16 wherein the step of invoking a translation process on the foreign computer includes passing a reference of a version indicator for providing to the foreign computer the user specified version of the component to be translated by the foreign computer, reference of the version indicator being passed in a pathname of the component to be translated by the foreign computer.

20. A method as claimed in claim 16 further comprising the step of transforming pathnames in one computer of the network to corresponding pathnames in other computers of the network.

21. Apparatus for heterogeneous building of a desired software system comprising:

a plurality of computers including a first computer and a foreign computer, each computer being of respective host type and the first computer being of a different host type than the foreign computer, the plurality of computers being loosely coupled to form a heterogeneous network;

configuration managing means executable on the first computer for building a user desired software system having a multiplicity of components, each component being of a respective user assigned host type, and for each component, the configuration managing means enabling a computer of the host type of the component to translate the component to generate derived objects of the component, such that system components of the host type of the foreign computer are translated by the foreign computer;

host type means for indicating to the configuration managing means the host type of each component of the user desired software system;

a build manager coupled to the configuration managing means for selecting for each component of the desired software system, a computer of the network to build the component;

a version indicator coupled between the configuration managing means and the foreign computer, the version indicator being employed by the configuration managing means to provide the foreign computer an indication of a user specified version of the component to be translated by the foreign computer, the version indicator including a set of user desired build attributes for building the software system, and the version indicator being passed to the foreign computer in a pathname;

a pathname transformation means for transforming a pathname in one computer of the network to a corresponding pathname in another computer in the network; and a pool having a first portion in a directory of the first computer for holding bound configuration threads used in building the software system and a second portion in a second computer directory for holding derived objects from system components translated by the foreign computer, such that bound configuration threads are stored separately from foreign computer derived objects, the second computer directory residing on any one of the computers in the network.

22. Apparatus as claimed in claim 21 wherein in response to a component being reassigned to a different host type, the configuration managing means enabling translation of the component by a computer of the different host type.

23. Apparatus as claimed in claim 21 wherein the version indicator comprises a pointer name, and the pathname passed to the foreign computer comprises a directory path followed by the pointer name followed by name of the component to be translated by the foreign computer.

* * * * *